United States Patent Office 2,908,349
Patented Oct. 13, 1959

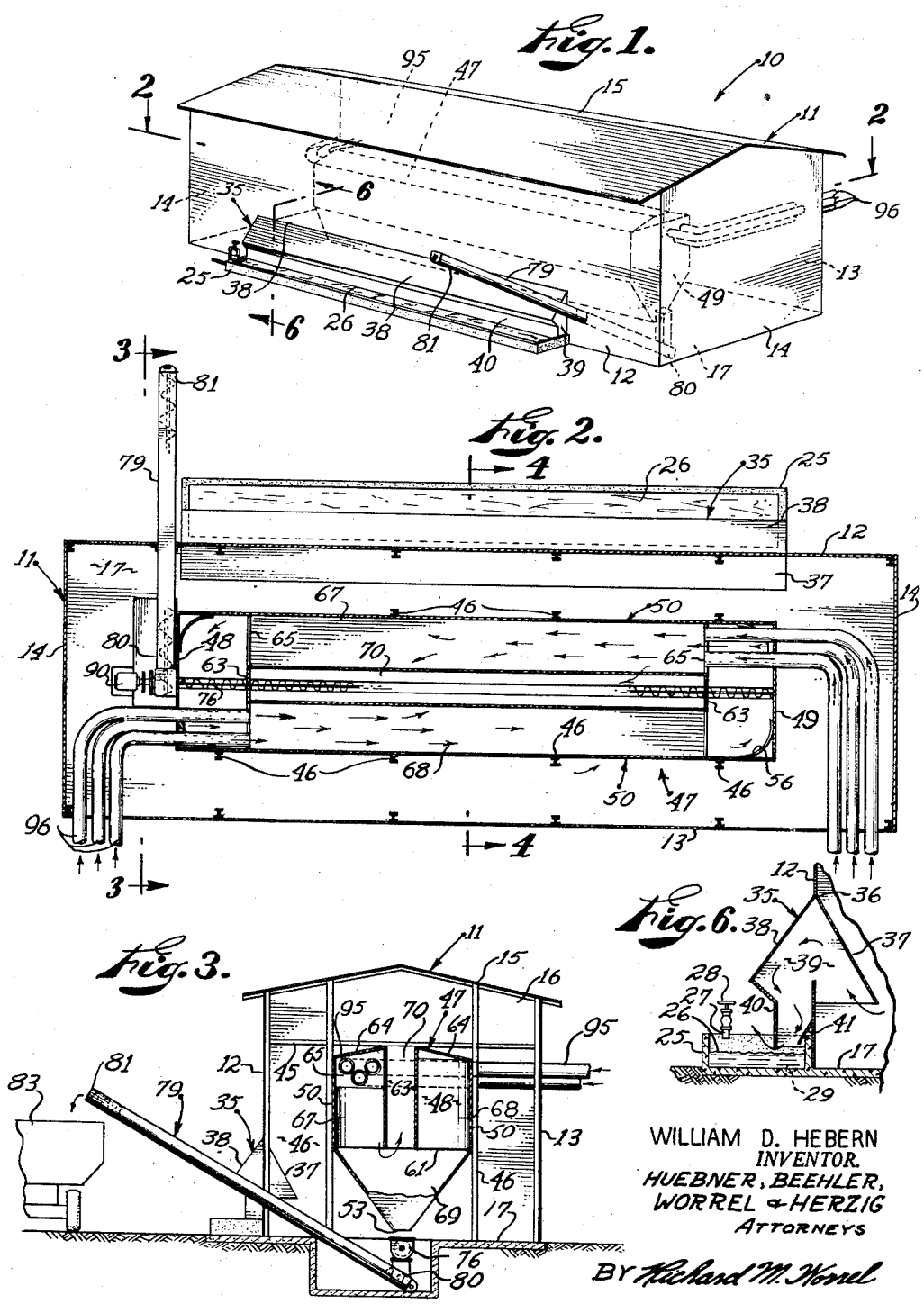

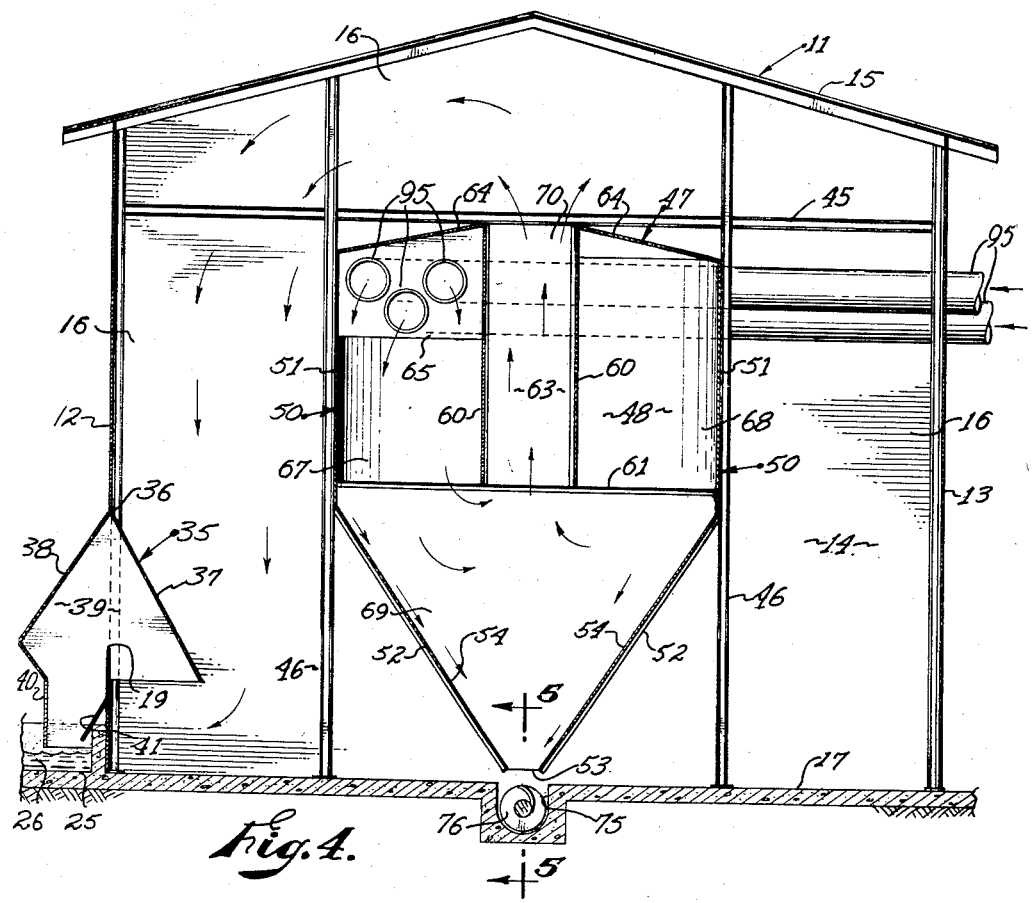
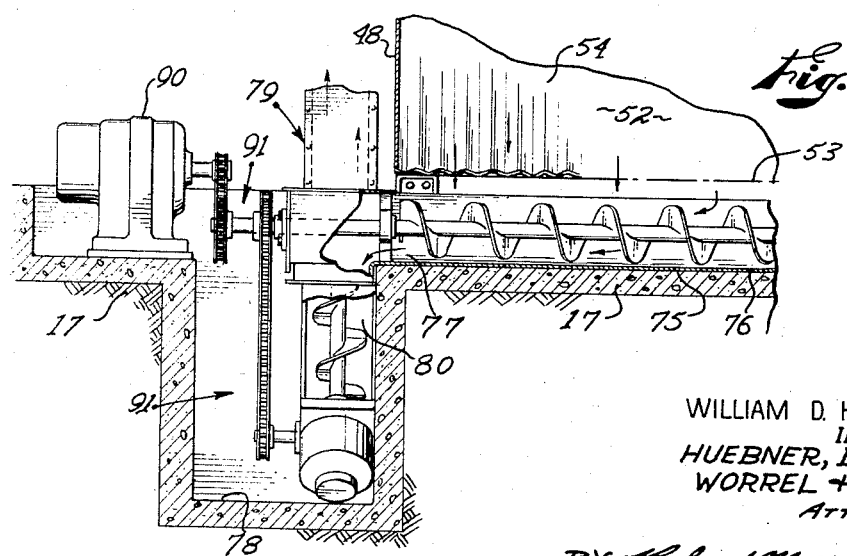

2,908,349

SEPARATING APPARATUS

William D. Hebern, Kerman, Calif.

Application August 31, 1956, Serial No. 607,368

7 Claims. (Cl. 183—30)

The present invention relates to a separating apparatus and more particularly to an apparatus for separating solid particles such as dust, dirt, trash, lint, and the like, from an air stream in which such particles are air-borne. The invention is conveniently illustrated by reference to the removal of lint and trash from the air-conveying streams of cotton gins.

During the past several years, there has been a gradual progression in the cotton industry to larger gins. The small gin of 150 to 200 horse-power is being replaced by modern gins requiring 400 to 600 horse-power depending, of course, on the amount of air volume and velocity required to transport the volume of cotton desired. These larger gins have resulted in serious lint, trash and dust control problems mainly because of the increased volume and velocity of air needed. The development of land around the gins for farming or residences, machine picking of the cotton which introduces increased quantities of trash into the cotton, and an ever increasing consciousness of air polution have made the problems even more acute. Legal actions for damages, condemnation and ejection of existing gins, and prohibitions against the installation of new gins where badly needed, all as a result of the dust control problem, are causing considerable concern and economic loss.

It is not to be inferred from the foregoing that dust control is limited to cotton ginning. Such a problem is found in many industries and there has been a widespread effort to find effective solutions to the problem. Accordingly, although the subject invention is conveniently described in a cotton gin as the operational environment, it is not to be so limited. For descriptive convenience, whenever "dust" is referred to hereinafter, it is intended to include dirt, trash, lint and other fine solid particles.

Although cyclone separators and other types of dust controllers have generally been satisfactory with small cotton gins, they have not been suitable with larger gins where there is an increased volume and velocity of air. Separation of dust in a cyclone separator is effected by centrifugal action, as is well-known. However, it has been found that dust normally settles by gravity along the bottoms of air pipes or conduits leading into the cyclone. When forced into such a separator, the dust and the air are re-mixed. Whereas centrifugal separators do not take advantage of this natural separation in an air line and actually undo much of whatever separation has occurred, the subject invention is designed to take advantage of the described gravitational separation.

With cyclone separators it has also been found necessary to blow the air and dust through a considerable length of pipe in order to build up adequate velocity to obtain centrifugation. This, of course, increases the amount of equipment needed and results in an even greater volume of air thereby additionally aggravating the dust control problem. Further, the exhaust of such cyclones into the air is unsatisfactory at high velocities and in large volumes.

Accordingly, it is an object of the present invention to minimize industrial dust and air polution and the hazards, inconveniences, eye irritations, odors, and generally harmful health conditions incident thereto.

Another object is to provide an improved apparatus for separating dust, trash, dirt, lint, and other solid particles from an air stream in which such particles are air-borne.

Another object is to provide an apparatus which separates solid air-borne particles from an air stream by gravity.

Another object is to enable the operation of cotton gins without objectionable dust dispersion therefrom.

Another object is to provide a separating apparatus which is more efficient than a centrifugal separator, especially when employed in a cotton ginning system.

Another object is to eliminate the extra air which is normally needed to operate a centrifugal separator.

Another object is to minimize the amount of equipment normally employed in a conventional air conveying system, and to increase the life and to reduce the maintenance of the equipment used.

Another object is to minimize the back pressure in an air system in which there is a need for separating solid foreign particles from the air.

Another object is to reduce labor costs in connection with the operation of a cotton gin and other industrial air systems involving the separation of dust from the air.

Other objects are to provide a separating apparatus which is simple, economical, dependable in operation, durable in construction, adapted to varied air systems, and which is highly effective for carrying out its intended functions.

These and other objects will become more fully apparent upon reference to the following description.

In the drawings:

Fig. 1 is a perspective view of a separating apparatus embodying the principles of the present invention.

Fig. 2 is a somewhat enlarged horizontal section taken on line 2—2 of Fig. 1.

Fig. 3 is a vertical section taken on a plane at a position indicated by line 3—3 of Fig. 2.

Fig. 4 is a somewhat enlarged, vertical section taken on a plane at a position indicated by line 4—4 of Fig. 2.

Fig. 5 is a somewhat enlarged, fragmentary vertical section taken on a plane at a position represented by line 5—5 of Fig. 4.

Fig. 6 is a somewhat enlarged, fragmentary vertical section taken on line 6—6 of Fig. 1.

Referring more particularly to the drawings, a separating apparatus is generally indicated by the numeral 10 in Fig. 1. The apparatus includes a building 11 constructed of sheet metal, plywood or any other suitable material having a pair of spaced parallel side walls 12 and 13, a pair of end walls 14 interconnecting the side walls in substantially rectangular relation therewith, and a ridge or gable roof 15 supported on the side and end walls. The building thus encloses a compartment 16 having the ground, indicated at 17, for a floor. The side wall 12 of the building has an elongated, substantially rectangular outlet opening 19 along a lower portion thereof.

An elongated, upwardly disposed trough 25 is rested on the ground 17 along the side wall 12 of the building 11 and beneath the outlet opening 19. For a purpose to be described, a quantity of water 26 is delivered to the trough by a water inlet pipe 27 having a faucet 28 connected thereto. The trough has a lower drain 29 for releasing water from the trough.

A substantially V-shaped inverted hood 35 is mounted in the outlet opening 19 of the building 11 and provides an upright apex edge 36 secured to the side wall 12, an inner side 37 downwardly outwardly extended within the building, an outer side 38 downwardly outwardly extended exteriorly of the building, and an apron 40 downwardly extended from the outer side into the trough 25. A flange 41 is connected to the side wall 12 and is likewise downwardly extended into the trough opposite to the apron so as to provide a downwardly disposed outlet for the hood communicating with the atmosphere but directed toward the water 26 in the trough.

A plurality of upstanding support posts 46 are mounted in spaced relation within the building 11 and extended from the ground 17 to the roof 15. Further, a plurality of beams 45 interconnect the side walls 12 and 13 in substantially horizontal positions and are preferably bonded to the upright posts. An elongated housing 47 provides a pair of spaced, parallel end panels 48 and 49 extended between the support posts 46 in substantially vertical positions. Elongated side panels 50 including substantially vertical upper portions 51 and downwardly convergent lower portions 52 interconnect the end panels in opposed relation to each other. The lower portions of the side panels taper downwardly to an elongated outlet orifice 53 adjacent to the ground 17. Furthermore, the lower portions have inner corrugations 54 extended downwardly along such portions transversely of the housing, as best seen in Fig. 5. A plurality of arcuate corner pieces 56 are secured between adjacent end and side panels of the housing so as to provide rounded corners therefor.

A pair of elongated, spaced, parallel side partitions 60 are mounted within the housing 47 on a plurality of braces 61 transversely interconnecting the side panels 50 above the lower convergent portions 52. A pair of end partitions 63 interconnect opposite end edges of the side partitions, and elongated upper panels 64 interconnect the side and end partitions and adjacent side panels 50. In addition, support plates 65 are mounted between the side panels and the side partitions at opposite ends of the housing for a purpose subsequently to be described.

The housing 47 thus provides a pair of elongated inlet chambers 67 and 68 of predetermined cross-sectional area or passage size having closed upper ends defined by the upper panel 64, and downwardly disposed lower openings communicating with a dust collecting or settling chamber 69 defined between the lower panel portions 52 and the end panels 48 and 49. Further, the side and end partitions 60 and 63 define an air outlet passageway 70 therebetween having a lower opening in communication with the settling chamber 69 and an upper opening communicating with the interior 16 of the building 11. It is also to be noted that the settling chamber has a cross-sectional area or passage size somewhat greater than the cross-sectional area or passage size of either of the inlet chambers. Similarly the volume of the settling chamber is greater than the volume of either of the inlet chambers.

An elongated ditch 75 is dug in the ground 17 below the building 11 and specifically beneath the outlet orifice 53 of the housing. A receiving screw conveyor 76 is mounted within the ditch and provides a delivery end 77 adjacent to an end of the building, as best seen in Figs. 1 and 5. A trench 78 is dug in the ground adjacent to the delivery end of the receiving conveyor, and a discharge conveyor 79 provides a supply end 80 extended downwardly into the trench and an upper discharge end extended outwardly through the side wall 12 of the building 11. It will thus be noted that the discharge conveyor is mounted in an upwardly inclined position with its supply end adapted to receive conveyed materials from the delivery end of the receiving conveyor. A trailer or truck, generally indicated at 83, is customarily provided below the discharge end of the conveyor 79 for receiving materials discharged therefrom.

An electric motor 90 is mounted within the building 11 adjacent to the trench 78 and has driving connection, generally indicated by the numeral 91, to the receiving and the discharge conveyors 76 and 79.

A plurality of elongated conduits 95 and 96 are extended through the side wall 13 of the building 11 and through end panels 48 and 49 into opposite ends of the housing 47. The conduits 95 extend into the inlet chamber 67 and are mounted on one of the plates 65, the conduits 96 extend into the inlet chamber 68 and are mounted on the other plate 65 so that air is discharged into said chambers in opposite directions, as indicated in Fig. 2.

Operation

The operation of the described embodiment of the subject invention is believed readily apparent and is briefly summarized at this point. When employed in association with a cotton ginning system, the building 11 is preferably attached to the gin building, not shown, and the conduits 95 and 96 are connected to the air system of the gin to receive dust from cleaners, extractors, driers, and other portions of the gin, air-borne in a stream of air ordinarily traveling at a velocity of approximately 60 miles per hour. It is to be noted that the air stream is generally quite warm.

The apparatus 10 is placed into operation by energizing the motor 90 so as to rotate the receiving and discharge conveyors 76 and 79. The faucet 28 is opened to admit a quantity of water 26 into the trough 25 and, of course, the drain 29 is closed.

Air streams containing dust are blown into the inlet chambers 67 and 68 on opposite sides of the housing 47 and travel in opposite directions longitudinally of the housing. As soon as the air enters the inlet chambers, it undergoes a reduction in velocity due to the substantially increased passage size of the air chambers relative to the conduits 95 and 96. When the force tending to carry the dust forward in the air stream has decreased to a predetermined amount, gravity settles the dust downwardly through the inlet chambers into the collection chamber 69, as best indicated in Fig. 4. It is to be noted that air streams traveling through the inlet chambers can circulate around the housing in circumscribing relation to the outlet passageway 70. The corner pieces 56 facilitate smooth circulation of the air.

The air in the inlet chambers 67 and 68 passes downwardly into the collection chamber 69 where it undergoes additional reduction in velocity and permits further settling of dust particles. The air, substantially free of dust, then passes upwardly through the outlet passageway 70 into the compartment 16 of the building 11. Here again the air enters a space having additionally increased passage size and thus is further reduced in velocity. This causes further gravitational settling of dust particles.

The air coming from the outlet passageway 70 forces cooler air near the roof 15 of the building 11 downwardly through the compartment 16 toward the ground 17 along the circulatory path indicated by arrows in Fig. 4. The cooler air passes out of the building through the outlet opening 19. This air may still contain a residuum of dust. However, the air is directed into or over the water 26 in the trough 25 where it is moistened so as further to settle dust particles. It will be evident that the air and dust are thoroughly separated by the time the air is finally released into the atmosphere.

Dust, dirt, lint, and like trash are collected by the receiving conveyor 76 and carried toward the delivery end 77 thereof where they are deposited into the supply end 80 of the discharge conveyor 79. The latter carries the waste upwardly for expulsion from the discharge end 81 thereof into a waiting trailer or truck 83 provided for the purpose. Dust is also collected on the ground 17 within the building 11 and in the water 26 in the trough 25. The water is periodically drained from the trough and the latter flushed out. In any event, dust is filtered from the air and collected prior to discharge of the air into the atmosphere so that pollution of the air is minimized.

In practice, the described separating apparatus has proved entirely satisfactory in association with a cotton ginning system. It is found to remove even very fine dust, lint, trash and dirt from air streams far more effectively than prior known devices and with a minimum of power. The structure involved is inexpensive, can be safely installed closely adjacent to gin buildings and other sources of dust without the usual fire hazard, thus saving expensive ducting, is economical to operate, and is subject to a minimum of deterioration. If damaged, it is readily accessible and easily repaired. Further, the instant invention is found to reduce labor and equipment costs and to improve health and safety conditions as well as the external appearance of gin buildings and the like and the areas in which they are located. The subject invention, therefore, is believed to constitute an important contribution to the art.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for separating dust from an air stream comprising a building providing an enclosed compartment therein and having a lower outlet opening communicating with the atmosphere; a housing mounted centrally within the building having a lower dust collecting portion and an upper portion, a pair of spaced end panels, a pair of spaced end partitions separated from the end panels, a pair of spaced side partitions extended between the end partitions defining therewith an elongated air outlet passageway having a lower opening communicating with the dust collecting portion and an upper opening communicating with the compartment in the building above the outlet opening in the building, side panels extended between the end panels in outwardly spaced relation to the partitions to define a pair of air inlet chambers having closed upper ends and lower outlets communicating with the dust collecting portion, the dust collecting portion having a downwardly disposed dust outlet; a conveyor mounted in substantially horizontal position beneath the outlet of the dust collecting portion of the housing for receiving and conveying dust therefrom; an elongated trough mounted exteriorly of the building below the outlet opening thereof; a dust wetting agent in the trough; and means for conducting air carrying dust into the inlet chambers of the housing from opposite ends of the housing for passage in opposite directions longitudinally in the air inlet chambers, the chambers being larger than the conducting means whereby the air undergoes a reduction in velocity and dust gravitates downwardly through the outlets into the collecting portion and substantially dust free air travels upwardly through the air outlet passageway into the compartment of the building and thence downwardly through said compartment for passage into the atmosphere through the outlet opening of the building, the wetting agent being adapted to settle any residual dust in the air.

2. An apparatus for separating minute solid particles of disposable materials from an air stream in which such materials are borne comprising a building having upstanding side and end walls joined in substantially rectangular relation, and a roof supported on the wall to provide an enclosed space within the building; a housing mounted within the building having a pair of spaced end panels, and a pair of spaced side panels providing downwardly convergent lower portions terminating in adjacent spaced relation to define a disposable material outlet, a pair of elongated spaced side partitions longitudinally extended between the end panels in spaced relation to the side panels and terminating above the downwardly convergent portions of the side panels, end partitions connecting the side partitions, the housing having upper panels connecting the side partitions individually to the end partitions and side panels adjacent thereto, there being elongated material inlet chambers defined between the side partitions and adjacent side and upper panels having closed upper ends, and lower ends opening into the disposable material outlet, and an elongated air outlet passageway between the partitions providing communication between the inlet chambers and the interior of the building; a receiving conveyor mounted in substantially horizontal position beneath the disposable material outlet of the housing for receiving disposable material therefrom for travel toward a delivery end thereof; a discharge conveyor mounted in upwardly inclined position in the building having a lower supply end below the delivery end of the receiving conveyor and an upper discharge end adapted to discharge disposable materials exteriorly of the building, one of the side walls of the building having an elongated opening therein; an elongated trough extended along the building beneath the opening in said wall; a quantity of water in the trough; a substantially V-shaped hood mounted in inverted position in the opening in the building wall having an apex secured to the building and downwardly divergent portions respectively extended into the building and outwardly over the trough; and air inlet conduits connected to opposite end panels of the housing with the conduit in one end panel entering one of the inlet chambers and the conduit in the opposite end panel entering the other inlet chamber for delivering air together with disposable solid particles borne therein into the housing, the inlet chambers being greater in size than the inlet conduits whereby the solid particles gravitate downwardly in the inlet chambers due to reduction in air stream velocity for passage through the disposable material outlet, and whereby the air circulates downwardly from the inlet chambers between the convergent lower portions of the housing and thence upwardly through the air outlet passageway into the interior of the building, thence downwardly through the building and into the hood to be directed into the trough of water so that solid particles remaining in the air are settled by the water.

3. An apparatus for separating dust from an air stream comprising a housing having an upper elongated inlet chamber of predetermined volume having a closed upper end and an open lower end, a lower settling chamber below the inlet chamber of a volume greater than the volume of the inlet chamber having an upper open end communicating with the open lower end of the inlet chamber, the housing also having an upper air outlet passageway providing an open lower end communicating with the settling chamber through the upper open end thereof and an open upper end and having partitioning means between the inlet chamber and the outlet passageway, said lower ends of the inlet chamber and outlet passageway thereby also being in communication with each other through the open upper end of the settling chamber; a duct of less cross-sectional area than the inlet chamber connected to the inlet chamber of the housing for conveying dust laden air at high velocity and introducing the same into the inlet chamber whereby said air undergoes a substantial decrease in velocity to permit dust therein to gravitate downwardly through the open lower end to the settling chamber, the air, substantially free of said dust, passing from the lower end of the inlet chamber through the lower end of and upwardly through the air outlet passageway and thence out of the open upper end thereof; an enclosure mounted around the housing providing a compartment in which the housing is located having a lower portion, a closed upper portion, and a volume greater than the volume of the settling chamber, the open upper end of the air passageway opening upwardly into the upper portion of the compartment for passage of substantially dust free air from the air outlet passageway into the compartment, the enclosure also having a lower outlet opening communicating with the atmosphere and in spaced relation below the open upper end of the air passageway, the air being further reduced in velocity in the compartment whereby dust remaining therein gravitates downwardly in the compartment; and means mounted externally of the enclosure adjacent to the outlet opening of the enclosure for moistening air emerging through the outlet opening further to settle dust from the air.

4. An apparatus for separating dust from an air stream comprising a housing having a lower dust collection portion and an upper portion, a pair of longitudinally spaced substantially parallel end panels, a pair of spaced substantially parallel end partitions in adjacent spaced substantially parallel relation to the opposite end panels, a pair of transversely spaced side partitions longitudinally extended between the end partitions defining therewith an elongated unobstructed air outlet passageway having a lower opening communicating with the dust collecting portion and an upper opening, side panels extended between and connected to the end panels in outwardly transversely spaced relation to the partitions and on opposite sides thereof to define a pair of elongated unobstructed air inlet chambers having closed upper ends, lower outlets communicating with the dust collecting portion, and being transversely interconnected at opposite ends by passages defined by the respective spaced end panels and partitions, the dust collecting portion having a downwardly disposed dust outlet; and means extended into opposite ends of the housing for conducting air carrying dust into the inlet chambers of the housing from opposite ends of the housing for passage in opposite directions longitudinally of the housing in the air inlet chambers and for circulatory movement into opposite inlet chambers through said end passages, the chambers being larger than the conducting means whereby the air undergoes a reduction in velocity and dust gravitates downwardly through the outlets into the collecting portion and substantially dust free air travels upwardly through the air outlet passageway.

5. An apparatus for separating dust from an air stream comprising a building providing an enclosed compartment therein and having a lower outlet opening communicating with the atmosphere; a housing mounted within the building having a lower dust collecting portion and an upper portion, a pair of spaced end panels, a pair of spaced end partitions separated from the end panels, a pair of spaced side partitions extended between the end partitions defining therewith an elongated air outlet passageway having a lower opening communicating with the dust collecting portion and an upper opening communicating with the compartment in the building above the outlet opening in the building, side panels extended between the end panels in outwardly spaced relation to the partitions to define a pair of air inlet chambers having closed upper ends and lower outlets communicating with the dust collecting portion, the dust collecting portion having a downwardly disposed dust outlet; an elongated trough mounted below the outlet opening of the building; a dust wetting agent in the trough; and means for conducting air carrying dust into the inlet chambers of the housing from opposite ends of the housing for passage in opposite directions longitudinally in the air inlet chambers, the chambers being larger than the conducting means whereby the air undergoes a reduction in velocity and dust gravitates downwardly through the outlets into the collecting portion and substantially dust free air travels upwardly through the air outlet passageway into the compartment of the building and thence downwardly through said compartment for passage into the atmosphere through the outlet opening of the building, the wetting agent being adapted to settle any residual dust in the air.

6. An apparatus for separating dust from an air stream comprising a housing having an upper elongated inlet chamber of predetermined volume having a closed upper end and an open lower end in vertically opposed relation to the upper end, a lower settling chamber below the inlet chamber of a volume greater than the volume of the inlet chamber having an upper open end communicating with the open lower end of the inlet chamber, and an upper air outlet passageway providing an open lower end communicating with the settling chamber and an open upper end, said upper and lower ends of the outlet passageway being in opposed elevationally spaced relation to each other; means for introducing dust laden air at high velocity into the inlet chamber whereby said air undergoes a substantial decrease in velocity to permit dust therein to gravitate downwardly through the open lower end to the settling chamber, the settling chamber being thereby filled with dust and precluding air passage downwardly therethrough, the air thereby passing upwardly through the air outlet passageway and through the open upper end thereof, the settling chamber having an elongated downwardly directed outlet through which dust in said settling chamber gravitates; a conveyer mounted beneath the outlet of the settling chamber for receiving dust therefrom and conveying the same remotely of the housing; an enclosure including interconnected side and end walls, a roof and a floor circumscribing the housing and providing a compartment in which the housing is located, the walls and roof being in spaced relation to the housing, said compartment having a volume greater than the volume of the settling chamber, the open upper end of the air passageway opening upwardly into the compartment for passage of substantially dust free air from the air outlet passageway upwardly into the compartment, said open upper end of the passageway constituting the only air outlet from the housing into the enclosure, the enclosure also having an outlet opening in spaced relation below the open upper end of the air passageway communicating with the atmosphere, the air being further reduced in velocity in the compartment whereby dust remaining therein gravitates downwardly in the compartment; and means mounted adjacent to the outlet opening of the enclosure for moistening air emerging through the outlet opening further to settle dust from the air.

7. An apparatus for separating dust from an air stream comprising an elongated housing having a lower dust outlet and an upper portion, a pair of transversely extended, longitudinally spaced substantially parallel outer upstanding end panels above the outlet each panel having inner and outer surfaces, a pair of transversely extended, longitudinally spaced, substantially parallel inner end partitions, the partitions being between the panels and parallel thereto with each partition being in adjacent spaced relation to the inner surface of a panel, a pair of transversely spaced upstanding side partitions longitudinally extended between and interconnecting the end partitions defining therewith an elongated unobstructed air outlet passageway having a lower opening communicating with the dust outlet and an upper opening, side panels extended between and connected to the end panels in outwardly transversely spaced relation to the partitions and on opposite sides thereof to define a pair of elongated unobstructed air inlet chambers, upper panels interconnecting adjacent side partitions and side panels providing the chambers with closed upper ends, the chambers further having lower outlets communicating with the dust outlet and being transversely interconnected at opposite ends by passages defined by the respective spaced end panels and end partitions; and means extended into opposite ends of the housing for conducting airborne dust into the inlet chambers of the housing from opposite ends of the housing for passage in opposite directions longitudinally of the housing in the air inlet chambers and for circulatory movement in the housing through opposite inlet chambers and end passages, the chambers being larger than the conducting means whereby the air undergoes a reduction in velocity and dust gravitates downwardly through the chambers into the dust outlet and substantially dust free air travels from the chambers under the partitions and upwardly through the air outlet passageway.

References Cited in the file of this patent

UNITED STATES PATENTS

| | | | |
|---|---|---|---|
| Re. 10,568 | Drummond | Mar. 10, | 1885 |
| 585,568 | Greiwe | June 29, | 1897 |
| 889,694 | Lambert | June 2, | 1908 |
| 941,676 | Green | Nov. 30, | 1909 |
| 1,073,621 | Murray | Sept. 23, | 1913 |
| 1,253,939 | Clark | Jan. 15, | 1918 |
| 1,434,090 | Christensen | Oct. 31, | 1922 |
| 1,527,010 | Powell | Feb. 17, | 1925 |
| 1,619,295 | Gardner | Mar. 1, | 1927 |
| 1,900,234 | Greenawalt | Mar. 7, | 1933 |
| 2,612,263 | Slavick | Sept. 30, | 1952 |

FOREIGN PATENTS

| | | | |
|---|---|---|---|
| 869,578 | France | Nov. 17, | 1941 |
| 474,800 | Germany | Apr. 13, | 1929 |
| 382,962 | Great Britain | Nov. 10, | 1932 |
| 492,978 | Great Britain | Sept. 30, | 1938 |
| 717,324 | Great Britain | Oct. 27, | 1954 |